Feb. 16, 1932. N. H. SANDBERG 1,845,562
DISCHARGE DEVICE FOR BELT CONVEYERS
Filed Feb. 7, 1929
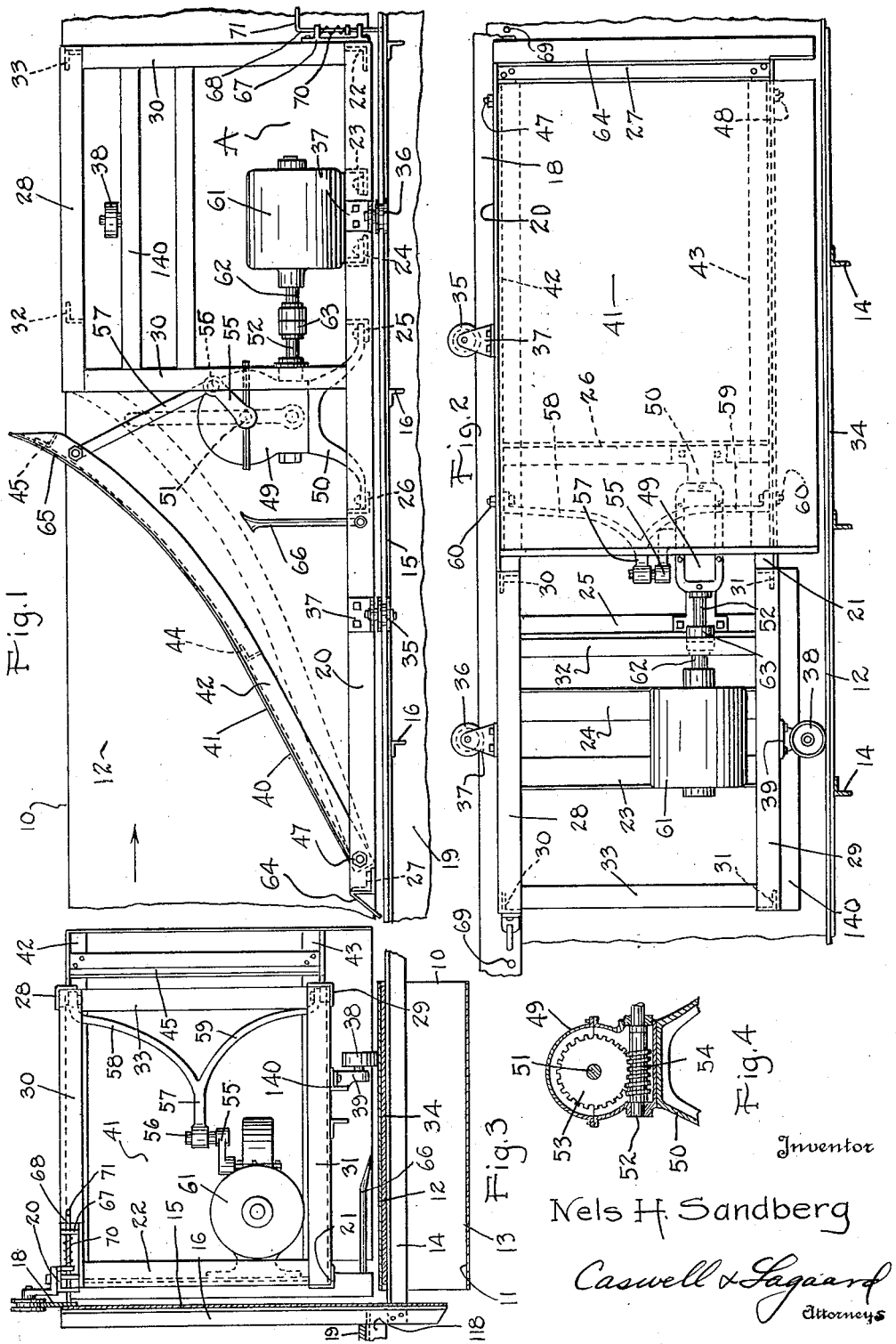
Inventor
Nels H. Sandberg
Caswell & Sagaard
Attorneys Patented Feb. 16, 1932

1,845,562

UNITED STATES PATENT OFFICE

NELS H. SANDBERG, OF MINNEAPOLIS, MINNESOTA, ASSIGNOR TO WALDORF PAPER PRODUCTS COMPANY, OF ST. PAUL, MINNESOTA, A CORPORATION OF MINNESOTA

DISCHARGE DEVICE FOR BELT CONVEYERS

Application filed February 7, 1929. Serial No. 338,179.

My invention relates to discharge devices and particularly to discharge devices applicable to belt conveyors.

An object of the invention resides in providing a device having a transversally disposed inclined deflector adapted to discharge the commodity conveyed upon the surface of the conveyor laterally therefrom.

Another object of the invention resides in providing a frame structure for supporting said deflector and in pivoting said deflector at one end thereto, and in arranging the other end of said deflector for oscillatory movement about said pivot to assist in discharging the commodity carried by said conveyor laterally therefrom.

A still further object of the invention resides in providing a crank journalled relative to said frame and connecting thereto, and in connecting to said crank and to the free end of said deflector, a pitman adapted to oscillate said deflector upon rotation of said crank.

A feature of the invention resides in providing driving means on said frame for operating said crank.

Another object of the invention resides in making the angularity of said deflector more abrupt near the free end thereof.

A still further object of the invention resides in providing a rail along said conveyor, and in movably mounting said frame upon said rail to permit of the disposition of said discharge device at any location along said conveyor.

A still further object of the invention resides in providing auxiliary supporting means for said frame adapted to engage the conveyor proper.

A feature of the invention resides in providing locking means adapted to engage said rail for holding the discharge device in adjusted position relative to said rail and conveyor.

Other objects of the invention reside in the details of construction thereof and in the novel combination and arrangement of parts hereinafter illustrated or described.

In the drawings:

Fig. 1 is a plan view of a portion of a belt conveyor illustrating an embodiment of my invention applied thereto.

Fig. 2 is a rear elevational view of the structure shown in Fig. 1.

Fig. 3 is an end elevational view of the structure shown in Fig. 1.

Fig. 4 is a plan sectional detail view of the driving mechanism used with my invention.

For the purpose of illustrating the application of my invention, I have shown, in the drawings, a belt conveyor, which I have indicated in its entirety at 10, and which comprises a belt 11 having an upper run 12 and a lower run 13. The exact construction of the conveyor 10, forming no particular feature of the instant invention, has not been described in detail. This conveyor belt may be operated through suitable pulleys and supported throughout its length by a plate 34 carried on transverse beams 14 or by rollers or other suitable means, such as now in common use for such purposes. My invention is particularly adaptable to conveyors utilized for conveying waste paper, although the same may be readily used for other commodities.

In the following description and in the claims, I have referred to the conveyor as a belt conveyor though it can be readily comprehended that the invention may be utilized with any similar type of conveyor, such as a slat conveyor or a chain conveyor having a suitable upper surface, the term being used principally to distinguish from screw conveyors and entirely different types of conveying devices.

Adjacent one side of the conveyor 10 is disposed a sheet iron wall 15 which is supported at suitable intervals by means of a number of uprights 16 of structural steel, such as angles or the like. These angles and said wall may be connected together at the upper portions thereof by means of a longitudinally disposed bar 18 which is riveted or bolted thereto and which projects somewhat above said angles and wall to provide a rail for supporting the frame structure comprising the invention proper. The angles 16 may be attached to any structure of the building proper in which the conveyor is installed, and, if it is desired, beams 118 may be attached to said angles, as shown in Fig. 3, to support a platform 19 used by the operator in the shifting of the discharge device and in the inspection and care of the conveyor.

The frame work of the invention proper, which I have indicated in its entirety at A, comprises two longitudinal frame members 20 and 21 which extend the entire length of the device and are positioned in close proximity to the wall 15. These frame members are connected together by means of uprights 22, 23, 24, 25, 26 and 27. In addition to the longitudinal frame members 20 and 21, two similar frame members 28 and 29 are employed which are spaced from said first named longitudinal frame members and are connected thereto through a number of transverse frame members 30 and 31. These longitudinal frame members are further connected together by uprights 32 and 33.

The entire frame structure A is slidably supported along the conveyor 10 so as to permit of discharging the commodity carried thereby from said conveyor at any point along the length thereof. The frame work 10 is principally carried by the bar 18 which serves as a rail for supporting the same. A pair of flanged wheels 35 and 36 are rotatably mounted on brackets 37 which are bolted to the upper longitudinal frame member 20 of frame 10. These wheels are adapted to ride upon the rail 18 and permit of readily moving the entire frame structure longitudinally of the device. The said frame structure is further supported through a roller 38 which is rotatably mounted in a bracket 39 secured to a longitudinally disposed channel 140. This channel is attached to the cross frame members 31 and extends beneath the entire frame structure at a height such as to bring the roller 38 in direct contact with the upper run 12 of the belt 11. As the belt 11 operates, the roller 38 rides upon the said belt and partially supports the entire frame structure.

The deflector, forming a part of my invention, which I have indicated at 40, is best shown in Figs. 1 and 2, and comprises a vertically disposed plate 41 which is riveted to two longitudinal angles 42 and 43. These angles may be stiffened at suitable intervals by means of uprights 44 and 45 secured thereto. The deflector 40 is pivoted at one end to the longitudinal frame members 20 and 21 by means of bolts 47 and 48 and is disposed diagonally across the entire belt 12, being movable from the position shown in full lines in Fig. 1 to that shown in dotted lines in the same figure.

The deflector 40 is oscillated about the pivots 47 and 48 to give the same a transverse jogging movement by means of a transmission device best shown in Figs. 1 and 4. This transmission device comprises a gear case 49 which is attached to a bracket 50 bolted to the upright frame members 25 and 26. In this gear case is journalled a vertical shaft 51 and a horizontal shaft 52. The shaft 51 is keyed to a worm gear 53 which meshes with a worm 54 fast on the shaft 52. Upon rotation of the shaft 52, the shaft 51 is driven at a relatively reduced rate of speed.

Upon the end of the shaft 51 and without the case is rigidly secured a crank arm 55 which is positioned slightly below the middle of the frame structure. This crank arm has pivoted to it by means of a pin 56, a forked pitman 57 having the upper branch 58 thereof pivoted to the angle 42 of deflector 40, and the lower branch 59 thereof similarly pivoted to the lower angle 43 of the said deflector by means of bolts 60. As the shaft 52 is rotated, shaft 50 is correspondingly rotated and the deflector 40 oscillated about its pivots 47 and 48 to give the said deflector a transverse reciprocable movement.

The shaft 52 may be driven through an electric motor 61 attached to the two uprights 23 and 24 of the frame structure A. The drive shaft 62 of this motor may be directly coupled to the shaft 52 through any suitable coupling as indicated at 63 in Fig. 1. Upon rotation of shaft 62 of motor 61, the device may be operated as desired.

In the operation of the device, the upper run 12 of the conveyor travels in the direction shown by the arrow in Fig. 1. When so moving, the paper or other commodity carried by said conveyor is caused to impinge upon the vertical surface of plate 41 forming a part of the deflector 40. This has the effect of shifting the paper laterally with respect to the conveyor belt and of discharging the same to the side of the conveyor. Such action is accentuated by means of the mechanism for oscillating the deflector 46 which assists in discharging the paper and, at the same time, prevents the device from clogging when an appreciable amount of paper is rapidly delivered to the discharge device. It will be noted in Fig. 1 that the length of the deflector 40 is such as to extend completely across the conveyor at all times, thereby preventing the commodity being carried past the end of the said deflector.

To prevent the paper from catching against the end of the plate 41, a guard 64 is employed which is angularly situated similar to said deflector 40, and which is attached to the upright 27. For the purpose of controlling the direction of travel of the commodity upon being discharged from the conveyor, the free end 65 of deflector 40 is slightly curved, as best seen in Fig. 1. This has the effect of causing the paper to leave the belt at more nearly right angles thereto and in limiting the amount of space required for the removal of the same so that the discharged commodity may be accurately spouted or led to the desired bin or point of discharge.

When small sheets of paper are being conveyed along the conveyor 10, frequently pieces of the same pass beneath the lower edge of the deflector 40 and are carried beyond the point of discharge. To obviate this, I employ a blast of air which is directed upon the upper surface of the belt 11 immediately below the deflector 40. This blast of air may be procured through a suitable nozzle 66 supported upon the frame work A and connected to a suitable source of compressed air. This air blast has the effect of elevating the paper lying upon the upper surface of the conveyor belt and bringing the same in contact with the deflector 46 from which the said paper may be discharged from the conveyor as well as driving it off from the belt.

As previously brought out, the entire frame work A may be conveniently moved along the conveyor 10 through the agency of the wheels 35 and 36 and the roller 38, so as to permit of discharging the commodity carried by the conveyor at any position along the extent of the said conveyor. For the purpose of retaining the discharge device in proper position, a locking mechanism shown in Fig. 1, may be employed. This device comprises a casting 67 which is rigidly belted to the upper cross frame member 30 and slidably supports a bolt 68. The bolt 68 is adapted to engage a series of holes 69 in the rail 18 and may be retracted from engagement therewith against the action of a coil spring 70 through the manipulation of a lever 71 formed on the end thereof. By the proper disposition of the holes 69, the discharge device can be caused to accurately discharge repeatedly at the same locality. It can be readily comprehended that the conveyor 10 may be disposed along beside suitable bins in which the commodity carried by the conveyor may be discharged or connected to other conveyors or spouts to meet with the requirements of the installation with which it is to be used.

My invention comprises a simple and effective device whereby the commodity carried by the ordinary belt conveyor may be readily and effectively discharged therefrom. The entire discharge device operates without requiring change in elevation of the belt, thereby reducing the power required for the operation of the device and simplifying the conveying of the commodity. The entire discharge device can be moved along the conveyor to discharge at any point thereof and operates to effectively remove the commodity from the conveyor.

Changes in the specific form of my invention, as herein disclosed, may be made within the scope of what is claimed without departing from the spirit of my invention.

Having described my invention, what I claim as new and desire to protect by Letters Patent is:

1. In combination with a belt conveyor, a frame, a deflector carried by said frame and extending within a short distance of said belt, and means for directing a blast of air between said deflector and belt.

2. In combination with a belt conveyor, a rail extending along said conveyor, a frame movable along said rail, a deflector superimposing said conveyor and pivoted at one end thereof to said frame, and means connected to the other end of said deflector and mounted upon said frame for oscillating said deflector about its pivot.

3. In combination with a belt conveyor, a deflector superimposing said conveyor and extending obliquely across said conveyor, means for pivotally supporting said deflector at one end, means connected at the other end of said deflector for oscillating said deflector about its pivot, said deflector being of a length sufficient to extend completely across said conveyor at all positions of said deflector, the free end of said deflector extending at a less acute angle with respect to the axis of the said conveyor than the pivoted end thereof to reduce the length of said deflector.

4. A discharge device comprising a supporting structure, a deflector pivoted at one end near the extreme edges thereof to said supporting structure, a crank for reciprocating said deflector, and a forked link operated by said crank and pivoted to the other end of said deflecter at points near the extreme edges thereof, said forked link serving to stiffen and reinforce said deflector.

5. A discharge device comprising a frame, a vertically arranged deflector pivotally connected to said frame, a motor mounted on said frame, reduction gearing driven from said motor and including a low speed vertically extending shaft, a crank attached to said shaft, and a link connected to said deflector and crank.

6. A discharge device comprising a frame, a vertically arranged deflector pivotally connected to said frame, driving means carried by said frame including a vertically extending shaft, a crank on said shaft, and a link connected to said crank and deflector for oscillating said deflector upon rotation of said shaft.

7. In combination with a substantially horizontal belt conveyor, a rail running along said conveyor, a frame movable along said rail and including a vertical frame structure extending in the direction of said belt, a deflector pivoted at one end to said vertical frame structure, a motor carried by said vertical frame structure, reduction gearing operated by said motor and mounted on said vertical frame structure, said reduction gearing including a low speed shaft, a crank attached to said shaft, and a link connected to said deflector and to said crank.

8. In combination with a belt conveyor, a rail running along said conveyor, a frame having a portion overlying said belt and a portion extending along said belt and projecting upwardly therefrom, a motor disposed above the overlying portion of said frame, a deflector pivoted to the outwardly extending portion of said frame, and a transmission mechanism driven by said motor for oscillating said deflector.

9. In combination with a substantially horizontal belt conveyor, a vertically disposed longitudinally extending frame structure situated along one edge of said conveyor, a deflector pivoted to said frame structure and extending therefrom obliquely across said conveyor to form an angular space between said deflector and said frame structure, and means for oscillating said deflector, said means being disposed within said angular space and attached to said frame structure.

10. In combination with a conveyor, a rail extending in the same direction as said conveyor, a frame movable along said rail, an inclined deflector carried by said frame and movably mounted thereon for movement in a defined path across said conveyor, said deflector superimposing said conveyor, and means carried by said frame and movable with said frame along said rail for continuously moving said deflector in its path of movement.

11. A discharge device comprising a frame, a deflector pivotally connected at one end thereof to said frame, a crank mounted on said frame, a connecting rod connected to said crank and to the free end of said deflector, and power transmission means carried by said frame for rotating said crank.

12. In combination with a conveyor, a side wall disposed on one side of said conveyor and extending along the same, a rail at the upper end of said side wall for reinforcing said side wall, a frame movable along said rail, a deflector connected to said frame, wheels attached to said frame at the upper portion thereof and riding upon said rail for partially supporting said frame, and other means for further supporting said frame for movement along said conveyor.

In testimony whereof I have affixed my signature to this specification.

NELS H. SANDBERG.